March 14, 1961  J. B. SAXTON  2,974,457
MACHINE FOR BUNDLING AND BALING TREES
Filed June 22, 1959  4 Sheets-Sheet 1

INVENTOR.
James B. Saxton
BY
ATTORNEY

March 14, 1961

J. B. SAXTON 2,974,457

MACHINE FOR BUNDLING AND BALING TREES

Filed June 22, 1959

INVENTOR.
James B. Saxton
BY
ATTORNEY

March 14, 1961   J. B. SAXTON   2,974,457
MACHINE FOR BUNDLING AND BALING TREES
Filed June 22, 1959   4 Sheets-Sheet 4
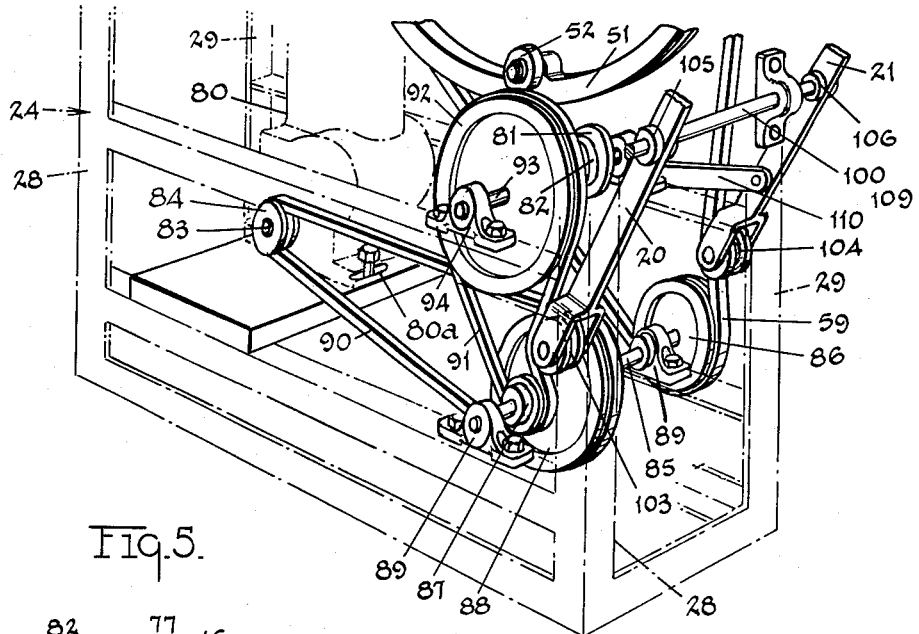
Fig.5.
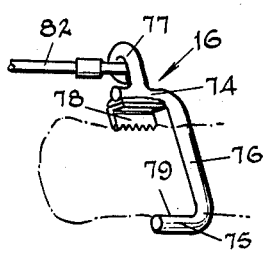
Fig.4.
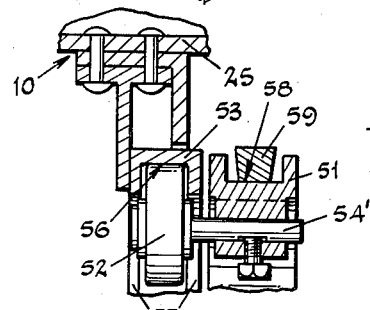
Fig.9.
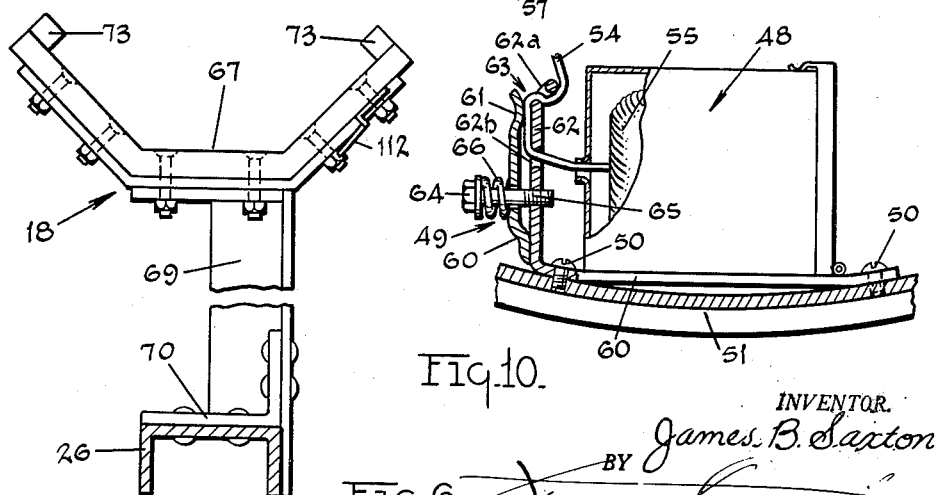
Fig.10.
Fig.6.
INVENTOR.
James B. Saxton
BY
ATTORNEY United States Patent Office 2,974,457
Patented Mar. 14, 1961

2,974,457
MACHINE FOR BUNDLING AND BALING TREES
James B. Saxton, 413 N. Monroe St., Blissfield, Mich.
Filed June 22, 1959, Ser. No. 822,010
8 Claims. (Cl. 53—124)

The present invention relates to an improved method and a machine for bundling and baling small trees, particularly cut fir and evergreen trees sold for decorative and festive uses such as are Christmas trees.

Heretofore, in order to expedite the handling and shipment of small cut trees, and also to reduce the transportation costs incurred in the shipment of such trees, and to diminish damage thereto resulting from broken boughs, etc., it has been found to be desirable to bind the boughs of each tree or a group of trees together into a compact bundle prior to shipment. Most preferably, the trees are bundled in the woods or nursery, quite soon after they have been felled.

It has been the practice to bundle the cut trees, either individually or in groups, with the use of a bundling machine which axially rotates the trees or group of trees and concurrently constricts and binds the boughs thereof tightly together. Such rotation of the trees, or groups thereof, as they are being compressed and bound, however, subjects the boughs of the trees to a severe twisting motion which tends to damage the trees and renders them less attractive and decorative and thus less salable. Additionally, previously known machines of this type operate with drive mechanisms which are not effective to prevent overloading of the machine. Consequently, the trees, as well as the machines, are frequently subject to damage resulting from an overloading of the machine. Since these machines are frequently operated in the vicinity of the tree cutting operations, break down may cause valuable time to be lost, particularly because repair parts and facilities are not readily available in the vicinity of the tree cutting operations.

Accordingly, my invention has as one of its principal objectives among others, the provision of an improved machine for bundling small cut trees, and the like, which avoids damage to the boughs of the trees and which is not subject to damaging overloading during use.

Another object of my invention is to provide a mobile and relatively light-weight machine which is capable of being easily transported to the site where trees are being cut and need to be bundled.

Still another object of my present invention is to provide a machine having the foregoing characteristics, which is further provided with means for bundling and baling the trees without necessitating rotating the trees during the bundling operation.

A further object of this invention is the provision of means for safeguarding the machine and trees from damage in the event the machine becomes overloaded during operation.

A still further object of this invention is to provide the machine with means for handling a great variety of tree shapes and sizes.

A still further object of this invention is to provide a machine of the foregoing type which is capable of bundling Christmas trees, and the like, either individually or in groups.

In addition, my invention has the teaching of new and novel method of bundling and baling small cut trees, as one of its objectives. The method which my invention teaches is characterized by drawing the tree trunk end first along a horizontal path while enfolding and radially compressing the boughs and restraining the tree against axial rotation, and tightly winding a line in a helical path, beginning at the trunk, around the thus enfolded and compressed tree boughs.

Supplementary to the foregoing, my invention also has for an object to teach the method by which in a single and the same operation small cut trees may be advantageously encased in a tubular moisture retaining and protective sheath or the like concurrently as the tree is drawn along a horizontal path and while the boughs thereof are being enfolded and radially compressed but before winding the line thereabout whereby the line holds both the casing and trees in assembled relation.

The specific nature of this invention, as well as other objects and advantages thereof, will become apparent to those skilled in the art from the following detailed descriptions taken in conjunction with the annexed sheets of drawings on which, by way of example only, the preferred embodiments of the invention and certain modifications thereof are illustrated, and wherein:

Fig. 4 is an enlarged view of the self-locking grappling apparatus provided on the machine for attachment to the trunks of the trees being bundled;

Fig. 5 is an enlarged perspective view showing power means and power transmitting devices employed in the operation of the machine;

Fig. 6 is an enlarged front elevational view of a work supporting table or stand provided on the machine for the trees as the trees are being bundled and after the bundling is complete;

Fig. 9 is an enlarged fragmentary sectional view of a portion of the baling unit shown in assembly in Fig. 1; and Fig. 10 is an enlarged side elevational view of the twine dispenser and tensioning device forming a part of the mentioned baling unit.

Figure 1:
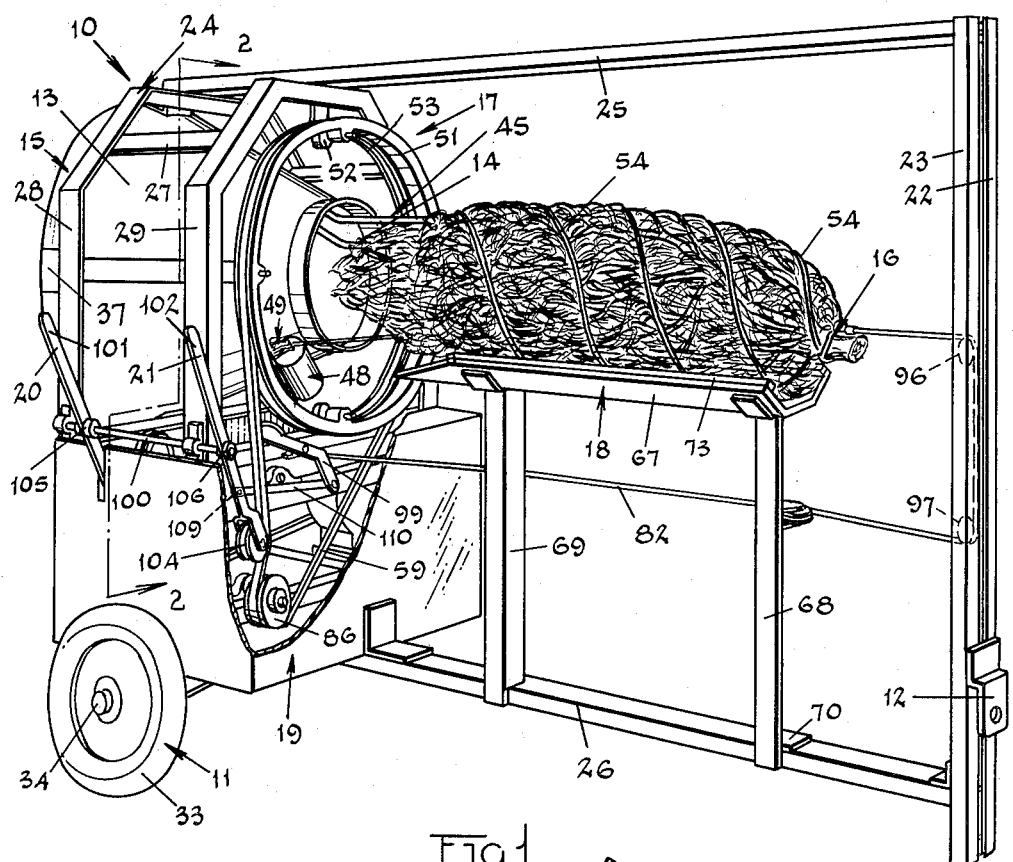
Fig. 1 is a perspective view of a tree bundling machine embodying the present invention.

With brief reference to Fig. 1, the machine in which the present invention is combined and embodied includes a mobile frame structure, indicated generally by the numeral 10, which is supported and balanced at one end upon a pair of wheels 11. By virtue of wheels 11 and a trailer hitch 12 on the opposite end of the frame structure, the machine may be attached to the rear of an automobile, or truck, or the like, and quickly moved to the location of the trees on the location of the tree cutting operation. Securely mounted in axially horizontal position on the frame structure 10 there is a hollow frusto-conical compression cone 13 having a smaller axial end 14 and a larger axial end 15, through the latter of which the trees are introduced trunk end first. To pull the trees and conduct them axially through the compression cone 13, there is a winch operated cable having a self-locking grappling jaw 16 which is adapted to clench the base of the trees. As a consequence of the diminishing size of the compression cone 13 the boughs of the trees are gradually constricted and compressed together into a compact bundle as they are drawn through the compression cone by the cabled grappling jaw 16. The boughs of the trees are bound snugly in place by a baling unit positioned adjacent to the smaller end of the compression cone, and indicated generally by the numeral 17, which receives and binds the trees while they are still emerging from the compression cone 13. In similar manner there is a work supporting stand 18 adjacent to the baling unit 17 which receives and supports the trees as they in turn emerge from the baling unit. A motor, various power transmitting devices and clutches for operation of the machine are enclosed within a paneled enclosure 19 located generally beneath the compression cone 13. Manual control of the operation of the machine is effected by manipulation of levers 20 and 21 extending through openings in the enclosure 19 and operating the clutches.

More specifically, the frame structure 10 of the machine defines a generally rectangular configuration when viewed in side elevation and forms a rigid carrier for the various parts of the machine. The frame structure 10 includes a pair of upright parallel studs 22 and 23 standing in close horizontally spaced relationship at one end of the frame structure 10. The studs are interconnected with an upstanding inverted U-shaped rig 24 situated at the opposite or front, operatively speaking, end of the frame structure by vertically spaced upper and lower tie bars 25 and 26. The U-shaped rig 24 is constructed with a double pair of legs 28 and 29 suitably braced together by horizontally spaced cross members 27 positioned at various vertically spaced locations.

As previously mentioned, the frame structure is rendered mobile by wheels 11. Each of the wheels are respectively mounted on interconnected struts 30, 31 and 32 extending downward from the legs 28 and 29 of the U-shaped rig 24 in such manner as to support the frame structure 10 in an elevated position with respect to the ground. Preferably, the wheels 11 have inflated tires 33, such as automobile tires, and are mounted to turn on individual axles 34 which in turn are suitably journalled or otherwise secured to the struts 30, 31 and 32. The trailer hitch 12, by means of which the machine may be hitched to and pulled behind an automobile, truck, or other such vehicle, is securely bolted or otherwise secured to the upright studs 21 and 22 at an elevation which will raise that end of the frame structure 10 off the ground when the machine is so hitched.

Figure 2:
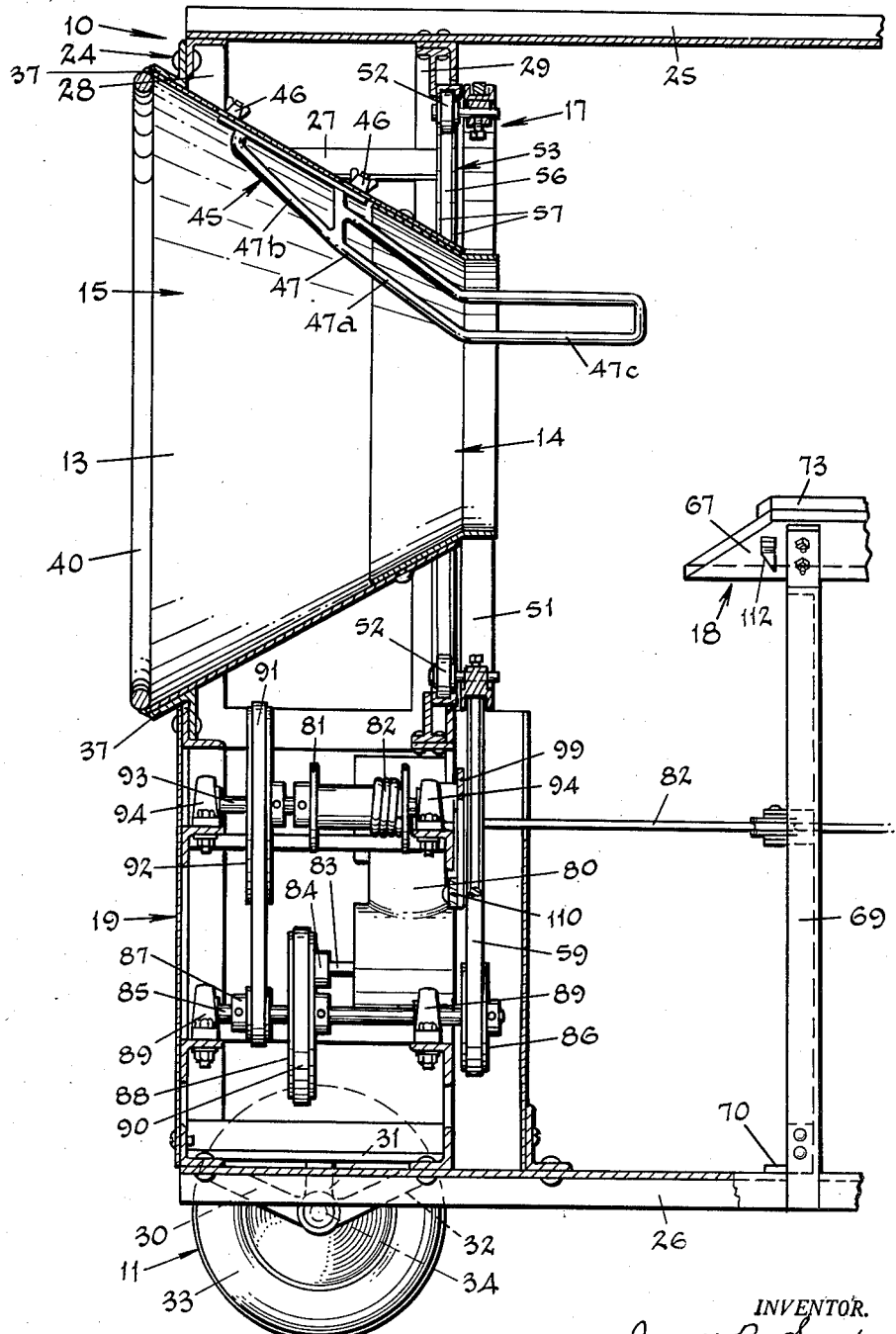
Fig. 2 is an enlarged vertical sectional view taken substantially along the plane of the line 2—2 indicated in Fig. 1.
Figure 3:
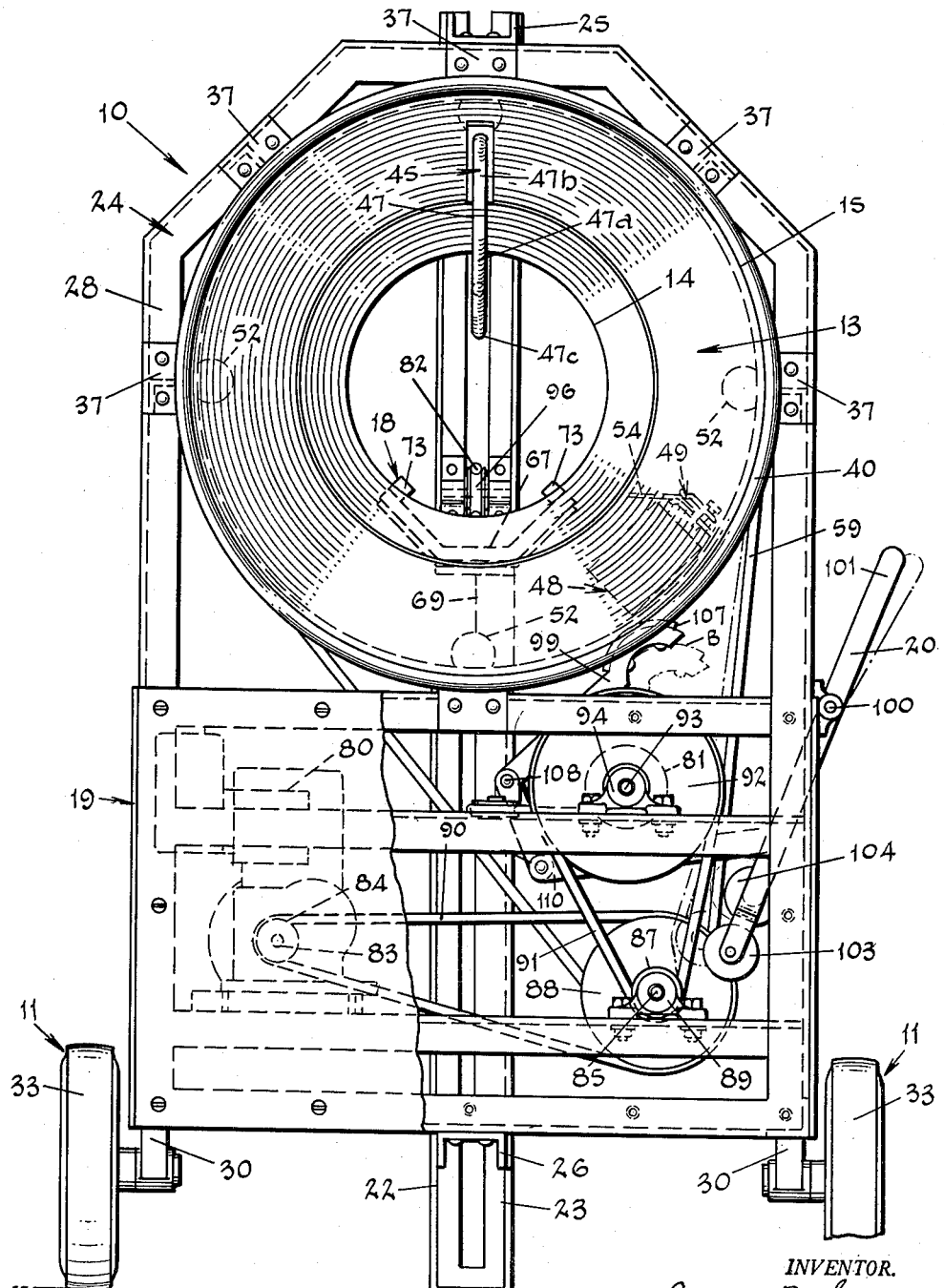
Fig. 3 is a vertical elevational view of the front end portion of the machine into which cut trees are introduced for bundling.

The compression cone 13, which serves to compress the boughs of the trees together, is rigidly mounted within the bight section of the U-shaped rig 24 by suitable brackets 37. The brackets 37 are welded or otherwise affixed to the exterior surface of the compression cone 13 and bolted to the U-shaped rig at various spaced locations around the periphery of the compression cone. As best illustrated in Figs. 2 and 3, the edge surface of the larger axial end 15 of the compression cone 13 has an annular buffer ring 40 mounted concentrically thereon. The buffer ring 40 is formed with a smoothly rounded peripheral surface to gradually enfold the boughs of the trees and thereby preclude damaging scraping thereof as the trees are drawn or advanced into the compression cone 13.

To prevent rotation of the trees within the compression cone 13 incident to moving the trees through the cone and relative to the zone of operation of the baling unit 17, which will be next described, a tree guide means 45 is bolted, as at 46, or otherwise mounted, on the interior surface of and projects radially into the axial passageway through the compression cone 13. The guide means 45, as illustrated, has a smooth and narrow runner 47. The runner 47, in its central portion 47ª, is substantially parallel to the interior surface of the compression cone 13 to which it is attached, and, in its leading end portion 47ᵇ, diverging toward and connecting with the interior surface of the compression cone, and, in its trailing end portion 47ᶜ, projecting from the smaller axial end 14 of the compression cone 13 and paralleling the axis thereof. Thus, the runner 47 tends to intercept and glide between the boughs of the trees as they are advanced through the compression cone and counteracts the tendency of the trees to rotate as a consequence of the application of a torsional force upon said trees during the drawing thereof through the compression cone and subsequent baling thereof.

As the trees emerge from the smaller axial end 14 of the compression cone 13, they pass through the axially adjacent baling unit 17 which operates to bind the enfolded and compressed boughs of the trees tightly together. Included as a part of the baling unit 17 is a twine dispenser 48, which is best illustrated in Fig. 10. The twine dispenser 48 holds a roll 55 of twine 54 and feeds same through an adjustable twine tensioning or biasing device 49 when the tree is being baled. The twine dispenser 48 through its flanged base is bolted or otherwise secured, as at 50, to a rotatable annular carriage 51 together with which it is adapted to rotate. The carriage 51 is supported in axial alignment with the compression cone 13 by concentric marginal array of rollers 52 shown in Fig. 1 of the drawings. The rollers 52 are rotatably journalled on stub shafts 54 extending laterally from the margin of the carriage 51. As best illustrated in Fig. 9, the rollers 52 are individually carried for rolling movement around an annular race 53 which in turn is bolted or otherwise rigidly secured at suitable spaced peripheral locations to the frame structure 10. The inner surface of the race 53 forms a channel or track 56 between parallel marginal flanges 57 extending continuously around opposite marginal edges of the race. The carriage 51 likewise defines a channel 58, best shown in Fig. 9, on its exterior peripheral surface in which to accommodate an endless drive belt 59 which is operative to impart rotary motion to the carriage 51, the operation of which will be subsequently more fully described.

Again referring to Fig. 10, the adjustable twine tensioning or biasing device 49 is preferably formed of resilient spring steel, or other material having similar characteristics of strength and resiliency, and includes a base 60 securely bolted, or otherwise firmly affixed, to the interior surface of the carriage 51 at a location proximately spaced from the twine dispenser 48. As in the embodiment illustrated, one of the bolts mounting the twine dispenser may also serve to mount the twine tensioning or biasing device 49 on the carriage 51. The body portion of the twine tensioning device 49 is angularly inclined from its base 60 and forms a bifurcate finger arrangement in which the fingers 61 and 62 are superposed and converge closely together toward their distal ends to a point of contact, as at 63. The fingers may be tightened together, or, conversely, loosened by means of an adjustment knob 64 having a shaft 65 loosely journalled through a transverse aperture in finger 61 and threaded into an internally threaded aperture in finger 62. A coil spring 66 coiled on the shaft 65 and biased between the adjustment knob 64 and finger 61 to effect movements of said fingers relative to each other in response to adjustment of the knob 64. Also, finger 62 includes a pair of transverse openings at 62ª and 62ᵇ which are closely spaced on opposite sides of the point of contact 63 and prevent the twine from being displaced from between the fingers. Thus, as the fingers 61 and 62 are drawn together by the adjustment knob 64, the twine is pinched therebetween.

The work supporting table or stand 18, over which the trees move and are brought to rest during and after emerging from the baling unit 17 and compression cone 13, includes a horizontal open ended trough 67 best shown in Figs. 1 and 6. The trough 67 defines a generally V-shaped cross-sectional configuration. Legs 68 and 69 mounted in upright spaced apart relationship on tie bar 26, as with gussets 70, support the trough near each end in lengthwise horizontally alignment with baling unit 17 and compression cone 13. In this respect, the spacing of the trough 67 relative to the baling unit 17 and compression cone 13 is such that the trough 67 will not be in a position to interfere with the twine 54 as it is being wound about the trees during the baling operation. Additionally, the trough 67 is provided with inwardly projecting cleats or guide rails 73 extending lengthwise along the upper edges of each side of the trough. These guide rails 73 form continuous sliding surfaces along which the trees may be drawn after they emerge from the compression cone 13 and which together with the guide rail 45 in the compression cone 13 tend to resist rotation of the trees.

Referring to Figs. 1 and 4, the grappling jaw 16, which in accordance with this invention is utilized in connection with a winch operated cable 82 yet to be described, is constructed in such manner that it clenches the trunk of the tree in self-locking manner when a pulling force, as through cable 82, is applied thereto. Structurally, the grappling jaw 16 has a C-shaped body portion formed by a pair of spaced parallel legs 74 and 75 and an interconnecting leg 76 cooperating to define a bight portion sufficiently large to accommodate the various sizes of tree trunks which are expected to be encountered during operation of the machine. Anchored to one of the parallel legs, such as the leg 74, there is a ring 77 through which the winch operated cable 82 is connected to the grappling jaw. An inwardly projecting blade-like member 78 formed or welded on leg 74 forms a gripping edge within the bight portion of the grappling jaw. Preferably, the gripping edge is serrated for surer gripping action. On the leg 75, opposite the blade-like member 78, there is a rounded or cylindrical bearing surface, as at 79. Consequently, when the grappling jaw 16 is attached to the trunk of a tree and pulling force exerted on the ring 77 the grappling jaw 16 will pivot on bearing surface 79 and clench the tree trunk between the blade-like member 78 and the leg 75. Cessation of the pulling force, however, quickly relieves the clenching action permitting the grappling jaw to be easily loosened and removed from the tree trunk.

From the grappling jaw 16, the cable 82 as shown in Fig. 1 is trained around a series of pulleys and is connected to a winch 81. More specifically, the path of the cable is such that it has an upper stretch which extends from the grappling jaw 16 and is trained around pulleys 96 and 97 carried between the upright studs 22 and 23 of the frame structure 10, and a lower stretch which continues from said pulleys to the winch 81, best shown in Fig. 5 and located within the paneled enclosure 19.

The power means, power transmitting devices and clutch arrangements situated within the paneled enclosure 19 will now be described in detail. Still referring to Fig. 5, a motor 80 mounted on cross braces on the frame structure 10 imparts rotational movements to the carriage 51 and the winch 81 through a series of pulley and belt drives. More specifically, the motor 80, which may be either an electric or a gasoline powered motor, but is preferably the latter, has an adjustable mounting, as at 80ª. Fixedly journalled on a drive shaft 83 of motor 80, there is a pulley 84 around which a a continuous drive belt 90 is tightly trained and which transmits continuous rotational movement from the motor 80 to a driven shaft 85. The driven shaft 85 carries a series of axially spaced pulleys, such as pulleys 86, 87 and 88, which rotate with shaft 85 and around the latter of which the previously mentioned motor drive belt 90 is trained. Pillow blocks 89, bolted or otherwise secured to the frame of the U-shaped rig 24, support each axial end of the driven shaft 85 and accommodate rotation thereof. The belt 59, by which the carriage 51 is rotated, is very loosely trained around pulley 86 and when tightened by a second clutch means, still to be described, transmits movement from the driven shaft 85 to carriage 51. The winch 81 is driven in a similar manner. More specifically, the winch 81 and a pulley 92 are journalled on a common shaft 93 supported at opposite ends for rotational movement in pillow blocks 94 fixed on the frame of the U-shaped rig 24. The pulley 92 is interconnected with the pulley 87 by a loose fitting belt 91 which is trained thereover. The loose fitting continuous belts 91 and 59 respectively interconnecting the winch 81 and carriage 51 with the driven shaft 85 are sufficiently slack or loose that the driven shaft 85 may be driven continuously by the motor 80 without such rotation being further transmitted from the driven shaft to the carriage 51 and winch 81. Hence, the loose arrangement of the belts provide clutch means. The levers 20 and 21, previously mentioned, are arranged so that an operator may tighten or loosen the belts 59 and 91 and thereby effectively control the operation of the carriage 51 and the winch 81. As a consequence, it is possible for the operator of the machine to interrupt the operation of the carriage 51 and the winch 81 at any particular moment and also to regulate the rate of movement thereof. This particular feature is quite important and serves as a safety measure in preventing damage which might otherwise occur in the event the machine is overloaded.

More specifically, the levers 20 and 21 are individually and pivotally mounted on a supporting shaft 100 by means of collars 105 and 106; the supporting shaft being welded or otherwise suitably secured at each end to the frame of the U-shaped rig 24. Handles 101 and 102 formed on the upper end of the levers 20 and 21, respectively, provide means for convenient manipulation of the levers by the operator of the machine. Sheaves 103 and 104 are mounted for axial rotation on the lower end of the levers and are arranged, when the handles 101 and 102 are pulley outward and downward, to swing into forcible engagement with the belts 91 and 59. Thus, by pulling the handles of the levers 20 and 21 in such manner the operator may force the sheaves 103 and 104 against the belts 91 and 59 to thereby tighten the belts against their respective pulleys and cause such belts to transmit rotational motion to the winch 81 and the carriage 51, selectively, as may be desired.

A braking mechanism for halting the rotational movement of the carriage 51 is also provided being operative in response to movements of the lever 21 and best illustrated in Figs. 3 and 5. This braking mechanism includes a bell crank whose arm 99 has a braking end on which a brake shoe 107 is mounted. A shaft 108 suitably secured to the frame structure of the U-shaped rig 24 carries the arm 99 and forms a pivot for the crank. Opposite the braking end, the arm 99 is connected to a lower part of the lever 21, as at 109, by an interconnecting linkage 110. Referring to Fig. 3, the pivotal movement of the braking mechanism is indicated by solid and broken lines: the solid lines the braking position of the braking mechanism and the broken lines B indicating the non-braking position.

The operation of the machine embodying the present invention is quite simple as will be seen from the following description. An individual tree, such as a Christmas tree, or a group of such trees are introduced trunk end first into larger diameter end 15 of the compression cone 13 and the grappling jaw 16 is attached to the trunk of the tree, or one of the trees of the group. Thereafter the winch operating lever 20 is pulled outwardly and downwardly by the operator to operate the winch 81 and thereby draw the tree axially through the compression cone 13. As the tree emerges from the smaller diameter end 14 of the compression cone 13, twine 54 from the twine dispenser 48 is fastened to the trunk of a tree and the carriage operating lever 21, is pulled outwardly and downwardly to release the braking mechanism and to tighten belt 59. This causes rotational motion to be transmitted to the carriage 51 which operates the baling unit 17. Now the operator by operation of the winch 81 continues the draw of the trees through the compression cone.

When the full length of the tree or trees have thus been drawn and tightly baled by the baling unit, lever 21 is returned to its original braking, thereby halting the carriage 51 and permitting the operator to sever the twine and tie the severed end to one of the loops of twine wound around the tree. The twine is preferably severed by means of a cutting hook 112, which is conveniently affixed to the underside of the leading end of the trough 67. To facilitate this severing and tying of the twine, it is important to note that the baling unit binds the twine around the end 47c of the runner 47 so that the latter forms a snubber bar with which to support the trailing small end of the tree or trees upon emerging from the compression cone 13. At this point, the baling and bundling operation will have been completed and the bundled tree or group of trees may be removed from the trough 67 by the operator.

Figure 7:
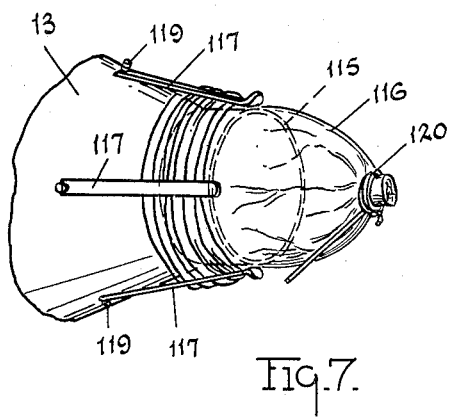
Fig. 7 illustrates a modified form of a part of the machine embodying the present invention by means of which the trees may be encased in a sheath.

Frequently it is desirable to not only bale a tree or a group of trees into a compact bundle, but to also enclose the tree or trees in a sheath or casing. A modified form of the invention illustrating apparatus for enclosing the trees in such fashion is shown in Fig. 7. As illustrated, an annular adapter 115 which is shaped to fit snugly over the smaller diameter end 14 of the compression cone 13 in a detachable manner, forms a holder for a supply of casing material 116, such as burlap, thin polyethylene, or other similar flexible material. The casing material is gradually fed from the adapter 115 between resilient fingers 117, which are located in spaced array around the periphery of the adapter 115 and which converge and press resiliently against the surface of the adapter. Each of the fingers 117 have a swivel mounting, as at 119, on the exterior surface of the compression cone 13 to permit the adapter to be quickly attached or detached from the compression cone 13. In operation, the casing material 116 is first drawn over the trunk of the tree and may there be tied, as at 120, by twine 54 so that the trunk is enclosed therein. Thereafter, the twine 54 from the twine dispenser 48 is tightly wrapped around the casing material 116 to hold same against the tree. Operation of the machine to draw the tree through the compression cone 13 then causes the casing material 116 to be drawn from the adapter 115 as the tree emerges from the compression cone 13 and causes the twine to bale the casing material tightly against the compressed boughs of the trees.

The foregoing described machine very efficiently performs the various steps in the method taught by my invention, and may be advantageously but not necessarily used to practice such method. Essentially, the method employs the steps of first attaching a baling line to the trunk of the tree to be baled. Then, the method teaches advancing the tree, trunk end foremost, along a horizontal path while concurrently enfolding and radially pressing the boughs of the tree and restraining the tree against axial rotation. The next step in my method is to tightly wind the trunk connected line in a helical path around the tree while the boughs are being retained in compressed condition and while the tree is continuing its movement along the mentioned horizontal path.

My invention also contemplates that a sheath like the casing material 116 may be used in the method taught by my invention. In this latter instance, the first step in the method of my invention comprises encasing the tree trunk within a tubular length of casing material, then attaching the baling line to the tree trunk and about the casing encasing the tree trunk. The steps that follow are those recited previously excepting that the casing material is drawn over to encase the tree and the bale line winds about the casing material enclosing the tree and its boughs. When casing material is to be used, particularly thin polyethylene, the act of restraining the trees from axial rotation is, because of the ready liklihood of that material to tear, of considerable importance.

Figure 8:
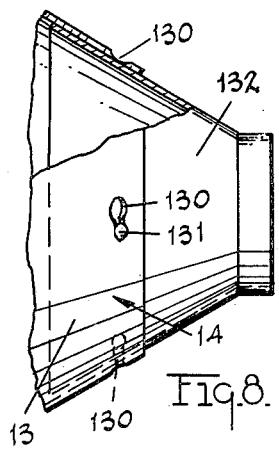
Fig. 8 illustrates still another modified form of a part of the machine embodying the present invention by which the machine may be readily adapted to bundle trees of different sizes.

Another modified form of structure which embodies my invention is shown in Fig. 8, which permits the effective size of the smaller end 14 of the compression cone 13 to be readily changed to accommodate varying sizes of trees or groups of trees. In this modification, the reduced diameter end 14 of the compression cone is formed with slots 130 into which lugs 131 of various sized interchangeable frusto-conical extensions, such as 132, may be received to form a bayonette-type interlocking arrangement. By this construction the effectiveness of the compression cone to vary the degree of compression of the boughs of the trees may be changed as desired.

By virtue of the above described machine, there is provided a machine which is operable to quickly and efficiently bale and bundle either an individual tree or a group of such trees. The machine provides easy accessibility of all operative parts and is capable of operation by a single operator. Additionally, the machine is adapted to enclose each tree or group of trees in a casing as the tree is being baled, if such casing is desired. Also, by virtue of the mobile construction of the machine it may be transported for use directly at the location where the trees are being cut. Further, the driving mechanism for the machine is constructed and arranged in such manner that the speed at which various parts of the machine operate may be readily regulated by the operator, as well as being constructed and arranged to prevent dangerous and damaging overloading of the machine.

It will, of course, be understood that various details of construction herein described may be modified throughout a wide range of equivalents and that the various steps in the method herein taught may be performed while using any of number of different structures or in fact without the use of any particular structure whatsoever, without departing from the principles of this invention, and it is, therefore, not the purpose to limit the patent granted hereon otherwise than as necessitated by the scope of the appended claims.

I claim:

1. An improved machine for binding a cut Christmas type tree comprising the combination of a mobile frame structure; a hollow frusto-conical compression member mounted in fixed position on the frame structure and defining a space therewithin of smaller size than the diameter of the tree to be bound; a baling unit carried on the frame structure intermediate the ends of the compression member and adjacent to the smaller axial end thereof and including an axially rotatable annular carriage member concentric with and surrounding the smaller axial end of the compression member; transfer means for advancing the tree in a trunk end first position along a path extending from the larger to the smaller axial ends of the compression member and through the hollow interiors of the compression and carriage members comprising a continuously running motor, a winch, a length of cable having one end affixed to the winch, and grappling means for detachable connection with the trunk of a tree to be bound secured to the other end of the cable and being shaped to clench the trunk of the tree and to form a self-locking detachable connection therewith in response to a pulling force exerted upon the cable by the winch; a twine dispenser mounted for rotation with the carriage member and carrying a supply of twine; means for rotating the carriage member in overrunning relationship to the mentioned smaller end of the compression member as the tree to be bound is transferred therethrough to helically wrap twine around the tree directly as it emerges from the compression member; twine biasing means mounted for rotation with the carriage member imposing tensional restraint on the twine while the latter is being payed out from the twine dispenser; a supporting stand securely mounted on the frame structure and positioned to receive and support the tree as it emerges from the carriage member; a continuous belt drive means interconnecting the mentioned continuously running motor and the winch, a manually operable clutch for engaging and disengaging the interconnection between the motor and the winch, and wherein the means for rotating the carriage includes a second continuous belt drive means interconnecting the mentioned continuously running motor and the carriage member, and a second manually operable clutch for engaging and disengaging the interconnection between the motor and the carriage member whereby selective individual engagement and disengagement of each belt drive interconnection means between the motor and the winch and the carriage member may be effected.

2. An improved machine for binding a cut Christmas type tree comprising the combination of a mobile frame structure; a hollow frusto-conical compression member mounted in fixed position on the frame structure and defining a space therewithin of smaller size than the diameter of the tree to be bound; a baling unit carried on the frame structure intermediate the ends of the compression members and adjacent to the smaller axial end thereof; the baling unit including an axially rotatable annular carriage member concentric and surrounding the smaller axial end of the compression member; transfer means for advancing the tree in a trunk end first position along a path extending from the larger to the smaller axial ends of the compression member and through the hollow interiors of the compression and carriage members; a twine dispenser mounted for rotation with the carriage member and carrying a supply of twine; means for rotating the carriage member in over-running relationship to the mentioned smaller end of the compression member as the tree is transferred therethrough to thereby helically wrap twine around the tree directly as it emerges from the compression member; twine biasing means mounted for rotation with the carriage member imposing tensional restraint on the twine while the latter is being payed out from the twine dispenser; a supporting stand securely mounted on the frame structure and positioned to receive and support the tree as it emerges from the carriage member; and a frusto-conical extension having a smaller sized end opening and a larger axial end opening shaped to telescopically fit on the smaller axial end of the compression member; and cooperating fastening means detachably interconnecting the larger axial end of said extension and the smaller axial end of said compression member whereby the compression member may be adapted to compress trees of smaller diameter.

3. An improved machine for binding a cut Christmas type tree comprising the combination of a frame structure; a hollow compression member mounted in fixed position on the frame structure and defining a space therewithin of smaller size than the diameter of the tree to be bound; a baling unit including an axially rotatable annular carriage member carried on the frame structure adjacent to one end of the compression member; transfer means for advancing the tree in a trunk end first position along a path extending from the other end toward the mentioned one end of the compression member and through the hollow interiors of the compression and carriage members; a twine dispenser mounted for rotation with the carriage member and carrying a supply of twines; means for rotating the carriage member in over-running relationship to the mentioned one end of the compression member as the tree is transferred therethrough to thereby helically wrap twine around the tree directly as it emerges from the compression member; and guide means disposed within the compression member adjacent to the path of movement of a tree therethrough and arranged to intercept and glide between the boughs of the tree as it is conducted through the compression and carriage members.

4. An improved machine for binding a cut Christmas type tree comprising the combination of a mobile frame structure; a hollow frusto-conical compression member mounted in fixed position on the frame structure and defining a space therewithin of smaller size than the diameter of the tree to be bound; a baling unit carried on the frame structure adjacent to the smaller axial end of the compression member; the baling unit including an axially rotatable annular carriage member surrounding the smaller axial end of the compression member; transfer means for advancing the tree in a trunk end first position along a path extending from the larger to the smaller axial ends of the compression member and through the hollow interiors of the compression and carriage members; a twine dispenser mounted for rotation with the carriage member and carrying a supply of twine; means for rotating the carriage member in overrunning relationship to the mentioned smaller end of the compression member as the tree is transferred therethrough to thereby helically wrap twine around the tree; twine biasing means mounted for rotation with the carriage member imposing tensional restraint on the twine while the latter is being payed out from the twine dispenser; a supporting stand securely mounted on the frame structure and positioned to receive and support the tree as it emerges from the carriage member; and guide means disposed within the compression member adjacent to the path of movement of a tree therethrough and arranged to intercept and glide between the boughs of the tree as it is conducted through the compression and carriage members.

5. The combination defined in claim 4, wherein the guide means comprises a narrow runner mounted within the compression member and disposed lengthwise thereof; the runner having an end portion projecting outwardly from said one end of the compression member and forming a snubber bar traversing the binding path of the twine whereby the twine binds the tree to the snubber bar to support the trailing end of said tree as it emerges from the compression member.

6. The combination of a manually operable clutch and belt drive arrangement for use with a machine for binding Christmas type trees and wherein the machine includes a hollow compression ring to receive through its center and compress the boughs of each tree; rotatable binding means to bind the compressed boughs; and transfer means for transferring each of the trees centrally through the compression ring; the combination comprising a continuously running motor; a pulley operably associated with the shaft of the motor and rotated thereby; a rotatable bundling means of the kind mentioned; a transfer means of the kind mentioned; a continuous belt operatively associated with at least one or the other of the transfer means and binding means and loosely entrained over the mentioned pulley with sufficient slack to preclude transmission of motion from the pulley to the belt, and manually operable clutch means arranged to selectively tighten the belt relative to the pulley and transfer motion therebetween to thereby provide manually controlled operation of the machine.

7. The combination defined in claim 6, wherein the clutch means comprises a lever having a pivotal mounting on the frame; a handle and a sheave spaced on opposite sides of the pivotal mounting; the sheave being arranged to engage the continuous belt and tighten same relative to the pulley in response to manual pivotal movement of the handle in one direction and to disengage and loosen the belt in response to movement of the handle in an opposite direction.

8. The combination defined in claim 7, including a brake arm linked at one end to the lever and having a brake shoe supported on the other end thereof; the brake arm having a pivotal mounting intermediate its ends for pivotal movements of the brake shoe into and out of braking engagement with the carriage member in response respectively to loosening and tightening movements of the lever relative to the belt.

References Cited in the file of this patent

UNITED STATES PATENTS

| | | | |
|---|---|---|---|
| 858,336 | Foley | June 25, 1907 |
| 988,347 | Johnson | Apr. 4, 1911 |
| 1,889,913 | Birum et al. | Dec. 6, 1932 |
| 2,328,085 | Maccarini | Aug. 31, 1943 |
| 2,467,286 | Young et al. | Apr. 12, 1949 |
| 2,825,990 | Hughes | Mar. 11, 1958 |
| 2,847,805 | Robbins | Aug. 19, 1958 |
| 2,878,634 | Hemness | Mar. 24, 1959 |